United States Patent [19]
Novoa et al.

[11] Patent Number: 5,769,486
[45] Date of Patent: Jun. 23, 1998

[54] TRUCK ROOF MOUNTING SYSTEM

[75] Inventors: Luis A. Novoa, Portland, Oreg.; Homer Franklin Wright, Jr., Vancouver, Wash.

[73] Assignee: Freightliner Corporation, Portland, Oreg.

[21] Appl. No.: 675,738

[22] Filed: Jul. 3, 1996

[51] Int. Cl.$^6$ ...................................................... B60P 3/32
[52] U.S. Cl. .......................................... 296/210; 296/190
[58] Field of Search ................................... 296/210, 190, 296/183, 203, 29, 30, 216, 218

[56] References Cited

U.S. PATENT DOCUMENTS

| | | |
|---|---|---|
| 1,693,750 | 12/1928 | Groehn . |
| 1,728,870 | 9/1929 | Masury . |
| 1,855,747 | 4/1932 | Ledwinka . |
| 2,036,555 | 4/1936 | Thompson et al. ...................... 105/401 |
| 2,489,670 | 11/1949 | Powell, Jr. ................................. 296/28 |
| 2,600,140 | 6/1952 | Torseth ..................................... 296/28 |
| 3,036,670 | 5/1962 | Jewell . |
| 3,131,649 | 5/1964 | Eggert, Jr. .............................. 105/401 |
| 3,827,137 | 8/1974 | Schubach .................................. 29/469 |
| 4,311,744 | 1/1982 | Watanabe .................................. 428/83 |
| 4,595,231 | 6/1986 | Bennett et al. . |
| 4,773,701 | 9/1988 | Messori . |
| 4,971,359 | 11/1990 | Takahaski et al. . |
| 4,973,103 | 11/1990 | Imajyo et al. . |
| 5,066,067 | 11/1991 | Ferdows ................................... 296/297 |
| 5,094,504 | 3/1992 | Wurl . |
| 5,310,239 | 5/1994 | Koske et al. ............................. 296/190 |
| 5,333,554 | 8/1994 | Yamada et al. ......................... 105/397 |
| 5,352,011 | 10/1994 | Kihara et al. ........................... 296/203 |
| 5,560,673 | 10/1996 | Angelo ..................................... 296/190 |

*Primary Examiner*—David M. Mitchell
*Attorney, Agent, or Firm*—Klarquist Sparkman Campbell Leigh & Whinston

[57] ABSTRACT

A reinforced coach joint for joining a roof of a truck to the sidewalls and/or rearwall of the truck involves clamping inwardly projecting flanges of the components to be joined between elongated reinforcing elements. Preferably the reinforcing elements define respective upwardly and downwardly opening channels that extend substantially around the periphery of the sidewalls, at least in a sleeper compartment area of a truck, and the rearwall of the truck. In a specific form, a lower reinforcing element has major sections with an h-shaped construction with an inner leg that projects upwardly above the elevation of the roof flange. This upwardly projecting reinforcing leg may engage a reinforcing leg of a sidewall reinforcing element positioned above the roof flange to further rigidify the construction.

29 Claims, 6 Drawing Sheets

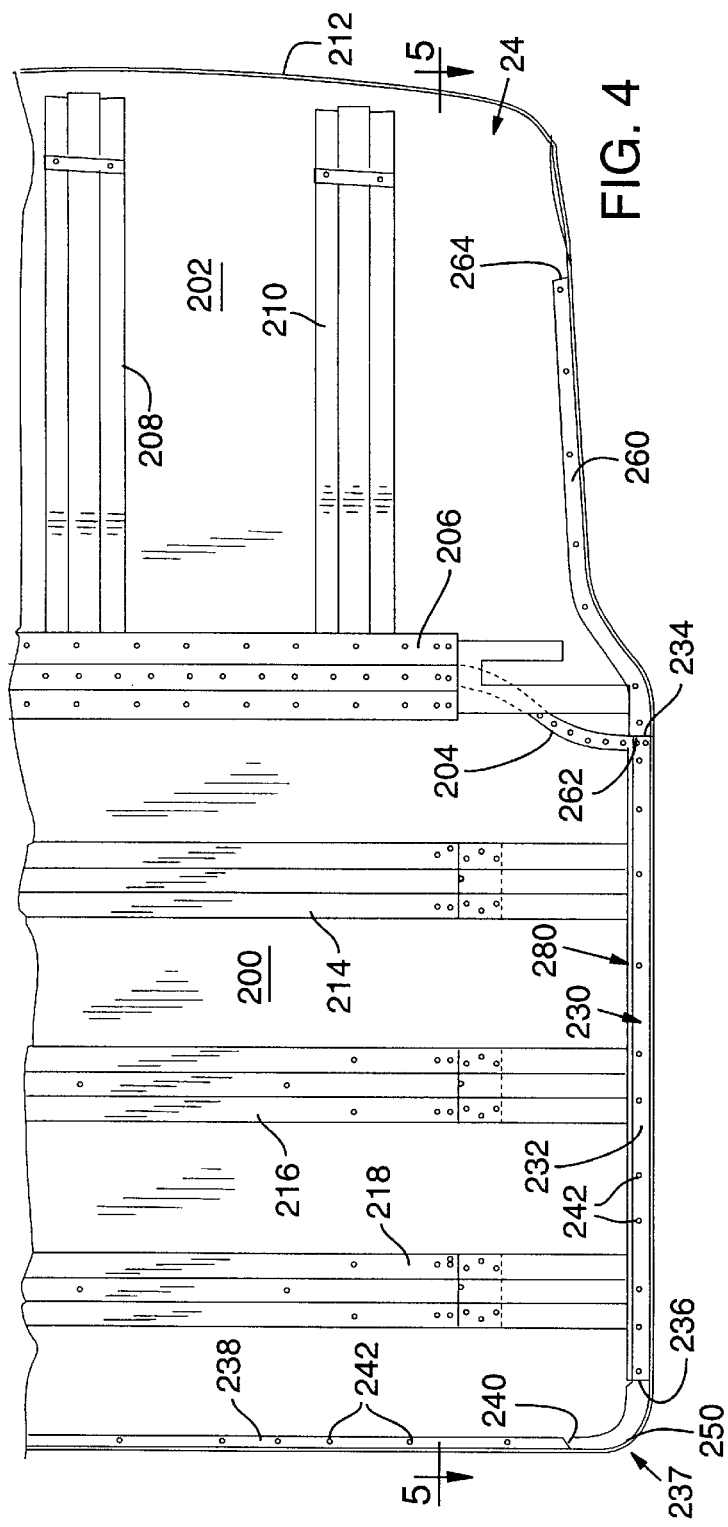
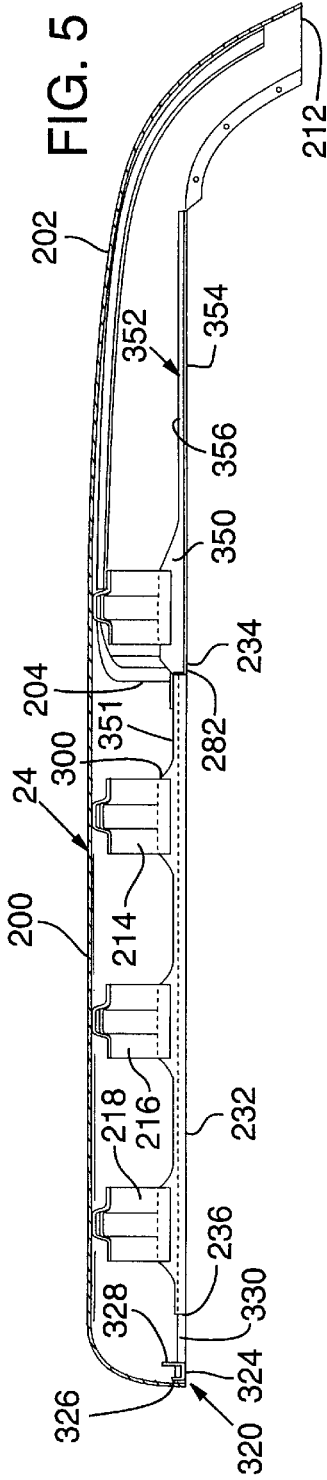

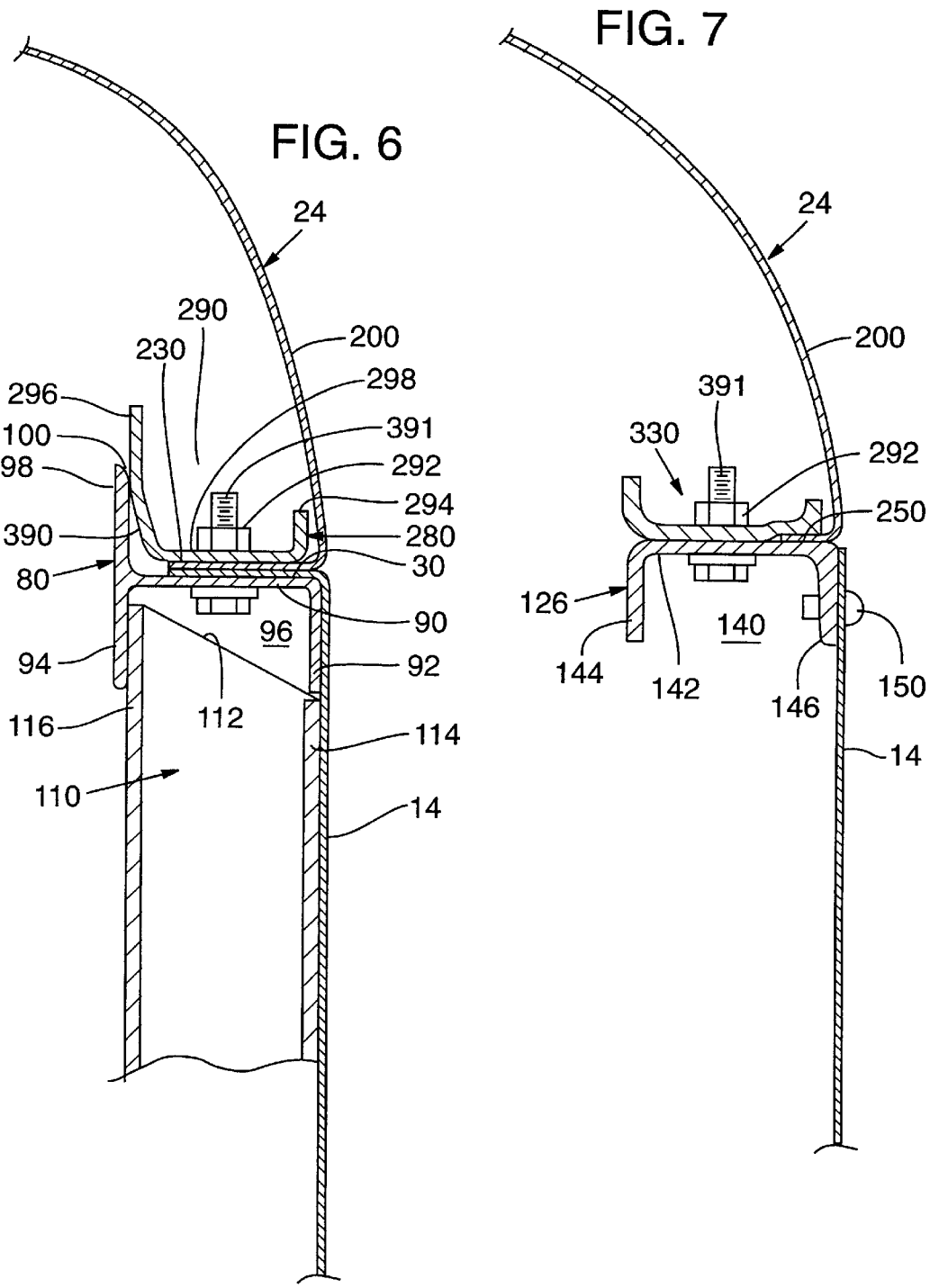

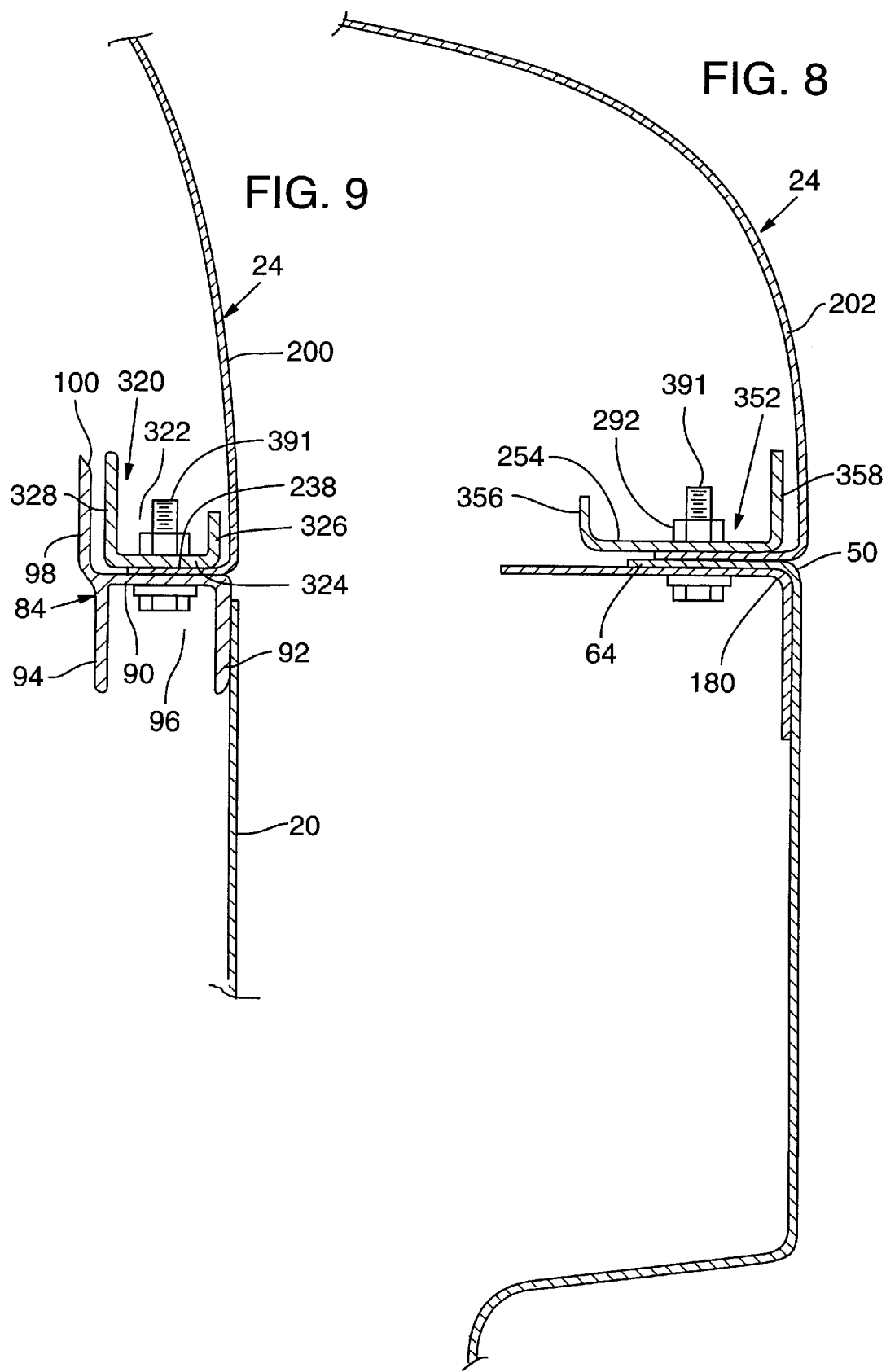

5,769,486

TRUCK ROOF MOUNTING SYSTEM

BACKGROUND OF THE INVENTION

The present invention relates to systems for interconnecting vehicle panels and has particular applicability to the mounting of a truck roof to the sidewalls and backwall of a truck.

In large trucks, particularly those with sleeper compartments, it is desirable to have an efficient and effective mechanism for attaching a roof to the sidewalls and backwall of the truck. Often, truck roofs are formed as a monolithic single unit or as a multi-sectional roof cap. The roof may be of a raised roof or other configuration. In the case of a roof cap, it is typically lowered in position relative to the sidewalls and rearwall of the truck and fastened in place.

In addition, in some approaches, a lap joint is formed between the upwardly projecting skin of the truck sidewalls and the downwardly projecting peripheral edge portion of the roof. Rivets or other permanent fasteners are inserted horizontally through the overlapping skin and roof to secure the roof cap in place. This approach not only results in additional fasteners penetrating the skin of the truck, which can lead to leaks, but also suffers from alignment problems. That is, it can be difficult to locate the roof at the appropriate elevation for mounting to the cab.

In addition, coach joints have been used in truck roof mounting applications. In a conventional coach joint approach, a portion of the roof periphery is provided with an inwardly directed flange. Similarly, the sidewalls of the truck are provided with inwardly directed flanges. The roof is installed by lowering the roof onto the sidewalls and backwall of the truck so that the roof flanges rest on the sidewall and backwall flanges. Fasteners such as rivets or spot welds typically are used to penetrate the respective flanges to hold the roof to the sidewalls and backwall. With this approach, it is difficult to align the roof with the sidewalls and backwall to give the truck a flush or other desired exterior appearance. In addition, the fasteners or welds are typically spaced every two to three inches along the roof flange to securely join these components together, requiring significant labor to install all of these fasteners. The rivets and other permanent fasteners used to mount the roof cap to the sidewalls and backwalls in this approach make it virtually impossible to readily remove the roof for repair or replacement.

Although trucks have existed for a long time with roofs fastened in some manner to the lower structure of the truck, a need exists for an improved truck mounting system directed toward overcoming these and other problems of the prior art.

SUMMARY OF THE INVENTION

In accordance with a first aspect of the present invention, a truck roof panel has an inwardly directed flange along a lower edge section of the roof panel. This flange is clamped by first and second reinforcing elements to mount the roof panel to truck sidewall panels or to a truck backwall panel or to both. At least one of the sidewall panels and backwall panel and preferably the sidewall panels also include an inwardly directed flange along an upper edge section which is also clamped by the first and second reinforcing elements.

As another aspect of the present invention, a first vehicle roof panel or cap and a second sidewall panel or panels of a truck are provided with elongated flanges along respective edge margins. These flanges are sandwiched between elongated reinforcing elements which are interconnected to secure the panels together. These reinforcing elements may be channel-like in their construction.

In accordance with another aspect of the present invention, a truck roof mounting system involves coupling an upper edge portion of a sidewall to a lower edge portion of a roof. The sidewall has an inwardly projecting sidewall flange portion along at least a section of its upper edge portion. The roof also has an inwardly projecting roof flange portion along at least a section of the roof lower edge portion. A first elongated reinforcing element, which may be formed of a plurality of sections, is positioned at least in part above the projecting roof flange portion. In addition, a second elongated reinforcing element is positioned at least in part below the projecting sidewall flange portion. These reinforcing elements are coupled together to clamp the roof flange and sidewall flange portions between the reinforcing elements in fixed relative positions, thereby joining the sidewall and roof. In a preferred approach, fasteners spaced along the length of the reinforcing elements penetrate the reinforcing elements and the respective sidewall and roof flange portions to secure the structure together. The elongated reinforcing elements increase the strength and rigidity of the joint and also reduce the need for a substantial number of fasteners. For example, readily removable threaded bolts may be positioned every eight inches along the joint with this construction.

As a further aspect of the present invention, the first and second reinforcing elements may define respective channels. More specifically, in this case the first reinforcing element may define an upwardly opening channel and the second reinforcing element may define a downwardly opening channel. At least a major portion of one of these reinforcing elements may be generally of a U-shaped cross-sectional configuration with first and second spaced-apart leg portions projecting outwardly from a base portion to form the U-shaped configuration. In addition, at least a major portion of the other of the reinforcing elements, in one form of the invention, is generally of an h-shaped configuration.

The truck may include a sleeper compartment having first and second sidewalls and a backwall, each of which has an upper edge portion. Furthermore, each of the first and second sidewalls may be provided with inwardly projecting sidewall flange portions extending along a major portion of the respective sidewall upper edge portions. The roof also has roof side and roof back lower edge portions with a roof flange portion preferably extending inwardly along a major portion of the roof side and roof back lower edge portions. The roof flange portion overlies and is preferably substantially coextensive with the sidewall flange portions when the roof is assembled to the sidewalls and backwall. In addition, the first and second reinforcing elements also are preferably coextensive with at least a major portion of the sidewall and roof flange portions. As a result, the roof flange portions and respective sidewall flange portions are clamped together by the first and second reinforcing elements. The roof, sidewalls and backwall are thus secured together along at least a major portion of the periphery of the roof.

The lowermost reinforcing element may have an inner leg which projects upwardly above the roof flange portion and which is configured so as to engage a leg of the sidewall upper reinforcing element. This further rigidifies the joint construction along the sidewalls of the truck. In addition, the construction may be such that the upper sidewall reinforcing element nests in the space between this upwardly projecting reinforcing leg and the side of the roof. Furthermore, the innermost leg of the sidewall upper reinforcing element may be provided with an inclined guide surface which is angled outwardly from a base portion of the sidewall upper reinforcing element toward the distal end of the leg. Consequently, as the roof is being lowered onto the sidewalls and backwall, the guide surface engages the upwardly projecting leg of the lower reinforcing element along the sidewalls and assists in guiding the roof into proper alignment.

As yet another aspect of the present invention, a sidewall may be provided with an upper edge portion having an inwardly projecting lip along at least a portion thereof. In addition, a roof may be provided with a lower edge portion having an inwardly projecting roof lip along at least a portion thereof. First and second elongated halo elements may sandwich the lip portions between them to couple the roof to the sidewall. These halo elements may be each comprised of a plurality of halo element forming sections. Preferably, these sections are interconnected to provide a continuous halo extending from a position along a sidewall of the truck, across the backwall of the truck, and to a position along the opposite sidewall of the truck. The halos are positioned to reinforce the roof to sidewall and to backwall joint, most preferably along a major portion of its entire length. A major section of one of the halo elements along the respective sidewalls and backwall may be of an h-shaped cross-section.

To further rigidify the system, at least one of the halo elements may be coupled to roof reinforcing ribs. The ribs span the space across the roof between the halo elements at the respective sides of the truck.

To facilitate installation of the assembly, the halo forming elements are preferably prebored with holes positioned for alignment with similar holes in the roof and sidewall flange portions. In addition, nuts are preferably mounted to one of the halo elements, for example to the upper surface of a base portion of an upper halo forming element. Consequently, when the roof assembly is mounted in place, the installer need not fumble with nuts or other fasteners in a blind or difficult to see location. Instead, the installer merely inserts each bolt through a lower halo element, the respective sidewall and roof flanges, through an upper halo element and into a nut. In addition, removal of the roof for repair purposes is facilitated as the bolts simply are removed.

It is, therefore, one object of the present invention to provide an improved roof mounting system for a truck.

A further object of the invention is to provide a roof to sidewall and backwall mounting structure which is extremely rigid.

Yet another object of the present invention is to minimize the number of fasteners required to join a vehicle roof to a vehicle sidewall and backwall and to also minimize the number of penetrations of the outer skin of the roof and sidewall that are made to complete the roof to sidewall assembly.

A further object of the present invention is to provide a roof mounting system which reduces the amount of labor required to install the roof and which enhances the alignment of the roof to sidewall and backwall elements.

The present invention relates to the above advantages, features and objects, individually as well as collectively. These and other objects, features and advantages of the present invention will become more apparent with reference to the following description and drawings.

BRIEF DESCRIPTION OF THE DRAWINGS

FIG. 4 is a bottom plan view of a portion of the roof of FIG. 3.

FIG. 5 is a vertical sectional view through a portion of the roof of FIG. 4, taken along line 5—5 of FIG. 4.

FIG. 6 is a vertical sectional view, taken along line 6—6 of FIG. 1, showing the roof mounting structure of one form of the present invention at this location.

FIG. 7 is a vertical sectional view, taken along line 7—7 of FIG. 1, showing a roof mounting system in accordance with one form of the present invention at this location.

FIG. 8 is a vertical sectional view, taken along line 8—8 of FIG. 1, showing one form of a roof mounting system at this location.

FIG. 9 is a vertical sectional view, taken along line 9—9 of FIG. 1, showing one form of a mounting system at such location.

DETAILED DESCRIPTION OF PREFERRED EMBODIMENTS

Figure 1:
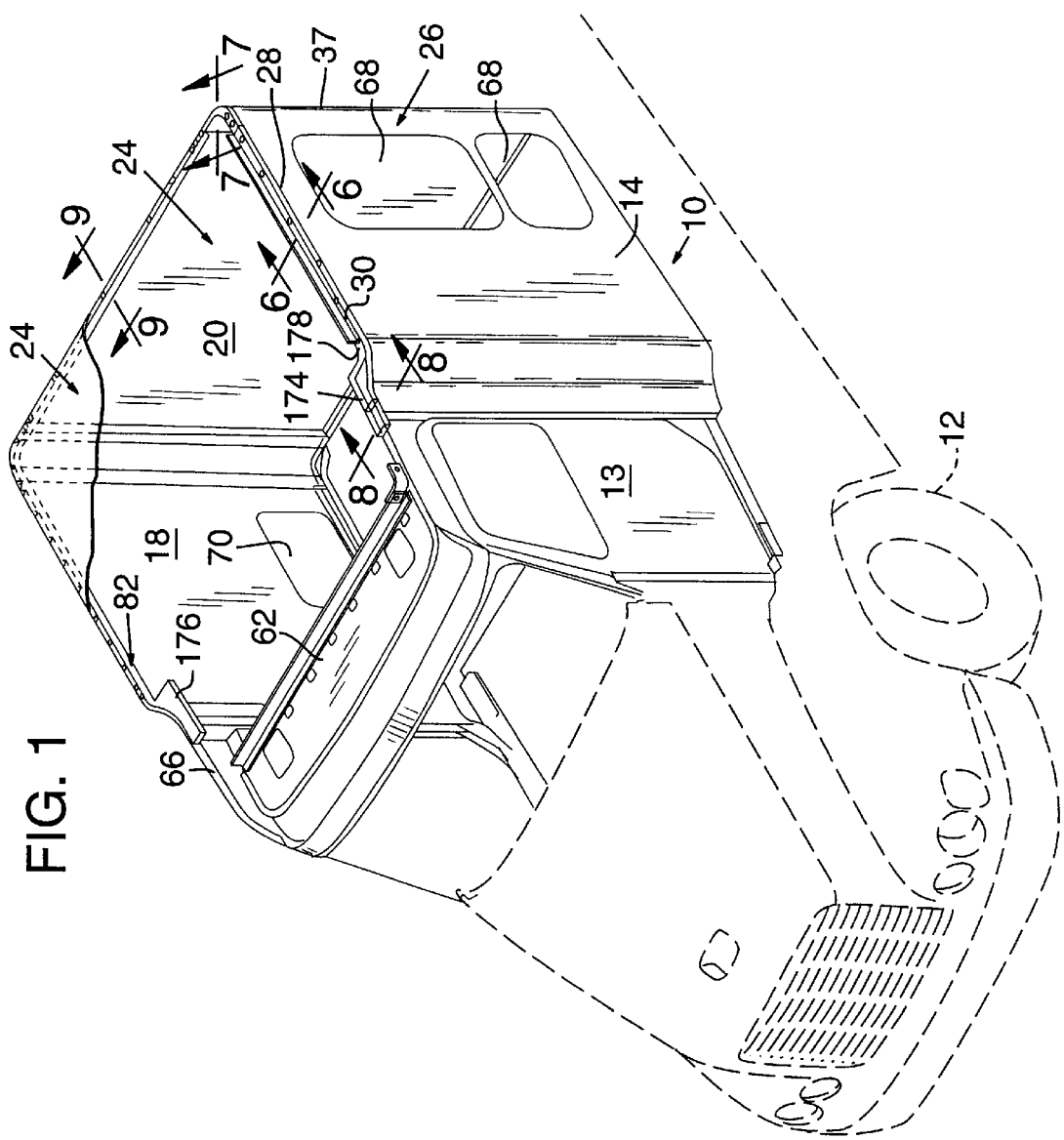
FIG. 1 is a perspective view of a truck incorporating a roof mounting system in accordance with one embodiment of the present invention.

FIG. 1 illustrates a truck 10 having a frame supported by wheels 12. The truck has a door 13 included in a first sidewall 14 which is opposed to a second sidewall 18 at the opposite side of the truck. In addition, the truck 10 includes a rear wall 20. A roof 24 forms a cap or enclosure which is mounted to the sidewalls and rearwall to complete the truck cab structure. The illustrated truck also includes a rear sleeper compartment 26, typically including a bunk and other amenities for use by a long-haul truck driver. The present invention is not limited to trucks with sleeper compartments, but is beneficial in such applications. In addition, the illustrated roof 24 in effect forms a cap with a joint between the roof and walls being indicated generally at 28. The illustrated roof 24 is of a mid-high roof configuration. The roof may be of the high-rise type or any other form so as to form the top or roof enclosure for the cab structure.

Figure 2:
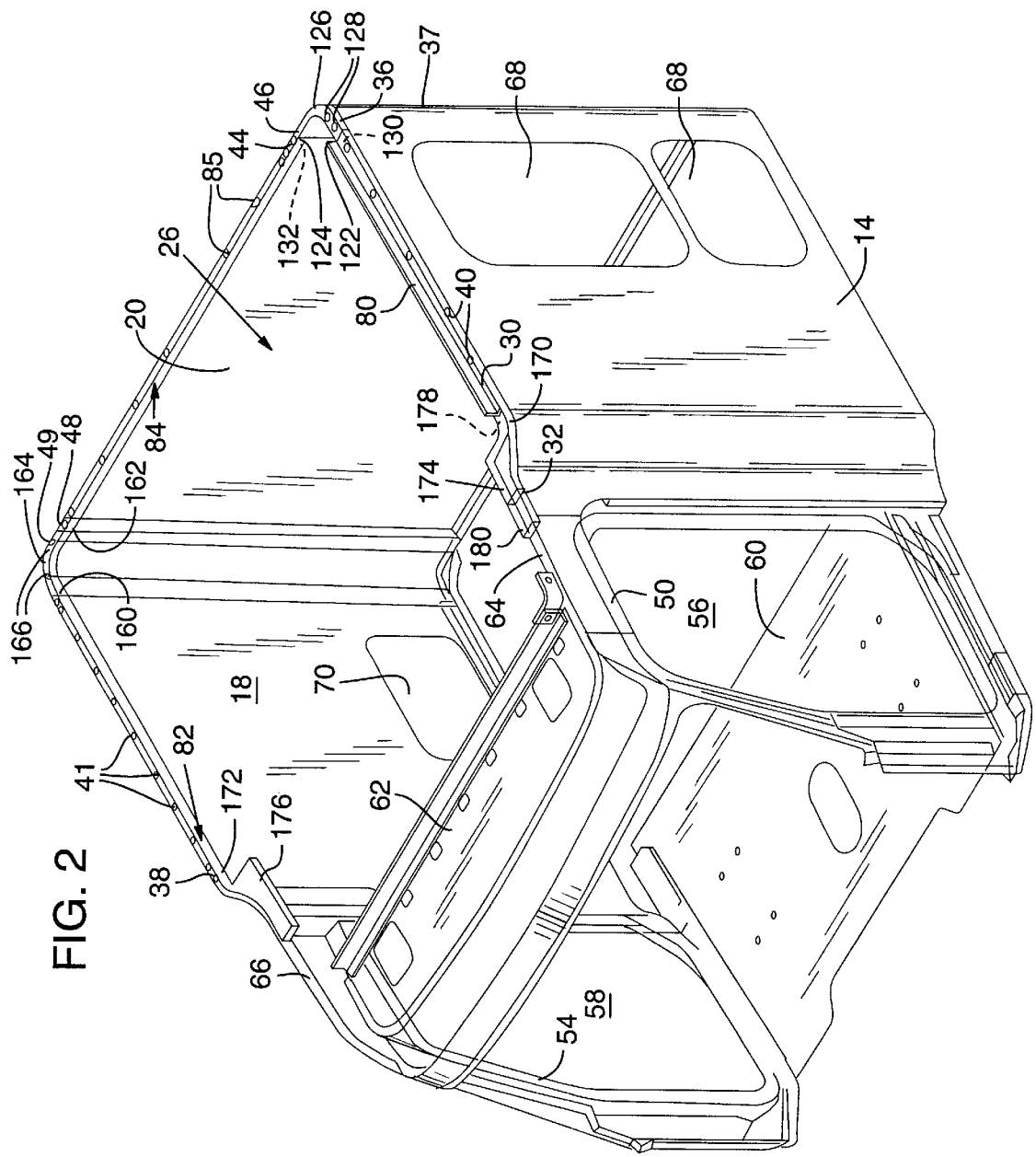
FIG. 2 is a perspective view of a truck cab of the type having a sleeper compartment and illustrating sidewall and rearwall inwardly extending flanges, and sidewall and rearwall reinforcing elements used in one form of the truck mounting system.

With reference to FIG. 2, it is apparent that the upper edge portion of sidewall 14 has an inwardly directed flange 30 extending along a substantial portion of the upper edge of the sidewall. The illustrated flange 30 extends from a location 32, just forwardly of the sleeper compartment, to a location 36 near or adjacent to the driver side rear corner 37 of the sleeper compartment 26. The flange 30 may be formed in any convenient manner. For example, if sidewall 14 is comprised of aluminum sheet material, the flange 30 may be formed by bending the upper edge of the aluminum sidewall forming sheet. The sidewall may also be of composite or other materials and typically includes reinforcing ribs, not shown in this figure. Flange 30 may be continuous between its start point 32 and end point 36, or it may be formed by discrete sections, which is less preferred. That is, in the preferred embodiment, the flange 30 extends continuously for a major portion of the length of the sidewall 14 and most preferably along at least about ninety percent of the upper edge of that portion of the sidewall which bounds the sleeper compartment. Sidewall 18 also has an upper edge portion having an inwardly directed flange 38. The sidewall flange 38 is typically the mirror image of the sidewall flange 30 and for this reason will not be described in detail. Each of the sidewall flanges 30, 38 include fastener receiving openings spaced apart along their length, some being indicated at 40, 41 in FIG. 2. The backwall 20 also has an upper edge portion 44. The backwall 20 in the illustrated embodiment does not have an inwardly directed flange, although it could be provided with such a flange extending along a major portion of the upper edge portion of the backwall 20. In the illustrated embodiment, the backwall 20 commences at a location 46 adjacent to corner 37 of the sleeper compartment and terminates at a location 48 adjacent to the other corner 49 of the sleeper compartment. Although not shown in FIG. 2, the backwall also typically has reinforcing ribs.

The cab structure illustrated in FIG. 2 also includes first and second door opening defining sections 50, 54 which define respective door openings 56, 58. A floor 60 extends between the door opening defining elements. An upper demi-roof section 62 extends across the front of the truck at an elevation above the windshield and approximately at the elevation of the upper portion of the door defining frames 50, 54. The door frame defining portions 50, 54 each include an upper inwardly projecting flange or rib portion, respectively indicated at 64, 66 in FIG. 2, for supporting the roof as explained below. The sidewall 14 may be provided with optional openings 68, and sidewall 18 may be provided with an optional opening 70. Such openings 68, 70, if provided, are typically enclosed by doors and form storage compartments for tools and the like used by the truck operator.

With the truck mounting system of the present invention and as explained more fully below, such fastener receiving openings 40 and 41 may be spaced relatively far apart about the periphery of the truck sidewall roof interface. For example, a typical spacing for such openings is approximately every eight inches. However, at corner and transition regions, the openings are preferably spaced closer together.

The inwardly directed flanges 30 and 38 form a lower portion of one form of an improved coach joint for the roof assembly. The details of this coach joint will become most apparent with reference to FIG. 6, below.

A plurality of elongated lower joint reinforcing elements are provided in the roof mounting system construction of the present invention. These elements preferably have portions extending beneath a major portion of the length of the inwardly projecting flanges 30 and 38 and along a major portion of the upper edge 44 of the backwall 20. By major portion, it is meant preferably one-half or more of the length of the flange.

In a specifically preferred form, the lower reinforcing elements, those positioned in part beneath the flanges 30 and 38 and along the upper edge of the backwall 20, include a downwardly opening channel at least along a substantial portion of their length. In FIG. 2, a lower reinforcing element 80 is shown associated with the flange 30, a lower reinforcing element 82 is shown associated with the flange 38, and a lower reinforcing element 84 is shown associated with backwall upper edge portion Element 84 has fastener openings 85 spaced along its length. The spacing may be the same as the spacing for openings 41 and 43. Each of these elements 80, 82 may be of a like construction and thus will be discussed with reference to element 80 and in particular with reference to the cross-sectional view of a portion of this element shown in FIG. 6. The element 84 is similar and will be discussed with reference to FIG. 9. As can be seen in FIG. 6, the illustrated reinforcing element 80 includes a base portion 90 positioned in an abutting relationship to the under-surface of the inwardly directed flange 30. First and second legs 92, 94 project downwardly from the base portion 90. The legs 92, 94 extend along the length of the reinforcing element 80 and together define a downwardly opening channel 96 therebetween. In the most preferred construction, the leg 94 also includes an upwardly projecting reinforcing element engaging portion 98, which extends above sidewall flange 30 and engages a reinforcing element coupled to the roof section as explained more fully below. The upper edge of leg portion 98, indicated at 100, is beveled downwardly and outwardly toward the roof 24 to provide a guiding surface to assist in the assembly of the roof to sidewall construction.

The sidewall 14 may be provided with a plurality of reinforcing ribs, one being indicated at 110 in FIG. 6. These ribs are typically beveled along their top edge portion, as indicated at 112 in FIG. 6. In this construction, the outer wall 114 of rib 110 terminates below the lower end of the leg 92 of reinforcing element 80. In addition, the lower leg portion 94 abuts against the inner surface of an innermost portion 116 of the reinforcing rib 110. Rivets or other fasteners, not shown, may hold the leg 94 and rib portion 116 together to rigidify the structure at such location. The rib 110 thus includes an upper end portion which nests in the channel 96 between the legs 92 and 94.

The lower reinforcing element 80 of the form shown in FIG. 6 has an h-shaped cross sectional configuration. similarly, the channel elements 82 and 84 also may have an h-shaped cross sectional configuration, although channel element 82 is the mirror image of the element 80.

The reinforcing element 84 along the backwall upper edge is shown in one form in FIG. 9. For convenience, like components to those shown in FIG. 6 have been assigned the same numbers. In FIG. 9, the element 84 has an upright leg portion 98 which is offset inwardly to a greater extent than the leg portion 94. Nevertheless, the reinforcing element 84 still generally h-shaped. Also, in the form of joint shown in FIG. 9, the upper edge of the backwall 20 lacks an inwardly extending flange comparable to the flanges 30, 38 of the sidewalls. Instead, the upper edge of backwall 20 is typically riveted, huck bolted or otherwise secured to the leg 92 of the reinforcing element 84. Alternatively, the backwall may be provided with a flange like the flanges 30, 38 if desired.

As best seen in FIG. 2, the rear end 122 of channel element 80 and adjacent end 124 of channel element 84 are interconnected by a lower corner reinforcing element 126. Element 126 has a plurality of openings, some being numbered 128 in FIG. 2, for receiving fasteners when the roof structure is assembled. The end portions 130, 132 of corner reinforcing element 126 are sized for insertion into and fastening within the respective channels defined between the legs of the elements 80, 84 in a telescoping-like manner. Thus, the lower corner reinforcing element 126 rigidly interconnects the reinforcing elements 80, 84 at the corner 37 of the sleeper compartment 26.

As best seen in FIG. 7, the reinforcing element 126 also preferably defines a downwardly opening channel 140. That is, the corner reinforcing element 126 includes a base portion 142 which abuts an inwardly extending flange 250 of the roof 26, as described more fully below. The element 126 also has downwardly projecting spaced-apart legs 144, 146 which define the channel 140 therebetween. Optional fasteners, such as rivets or huck bolts, one being indicated at 150 in FIG. 7, may be used to join the upper edge of the sidewall 14 to the leg 146 of the reinforcing element 126. Although it may, typically the sidewall would not have an inwardly projecting flange at the corner 37 where the sidewall turns to join the rearwall 20 of the truck. Another corner reinforcing element 164, like the element 126, is positioned at the opposite corner 49 of the truck from the corner 37. The reinforcing element 164 thus may be generally U-shaped in cross section with a downwardly opening channel and may be provided with a plurality of fastener receiving openings such as indicated at 166 in FIG. 2. In addition, the element 164 preferably has end portions which are telescopingly inserted into the channels defined at the respective end portions 160, 162 of the reinforcing elements 82, 84 to interconnect such elements.

With the above construction, the illustrated lower reinforcing elements include a plurality of sections which comprise one example of halo forming sections, which are interconnected to form a continuous lower reinforcing structure from a location 170 at the forward edge of the reinforcing element 80, and thus at the forward edge of the sleeper compartment 26 defined by sidewall 14, along the upper edge of sidewall 14, around corner 37, along the upper edge of the backwall 20, around the corner 49, and along the upper edge of the sidewall 18 to a location 172. Location 172 is across the vehicle from location 170 and is at the forward edge of the sleeper compartment 26 bounded by sidewall 18.

Respective reinforcing elements 174, 176 may be provided to reinforce a transition region, if included in the truck. The transition region is that region of the truck where the sleeper compartment narrows as a transition is made from the sleeper compartment to the forward cab portion of the vehicle. Elements 174 and 176 may be mirror images of one another and thus will be described with reference to element 174. The element 174 includes a tail section 178 which is sized for telescoping insertion into and fastening within the channel 96 defined at the forward end portion 170 of the reinforcing element 80. The forward end 180 of the reinforcing element 174 is connected to the lip a flange 64 over the door (see FIG. 8) to in effect provide a continuous reinforced roof support between the door openings and along the rear sleeper compartment sidewalls and backwall perimeter of the cab.

Figure 3:
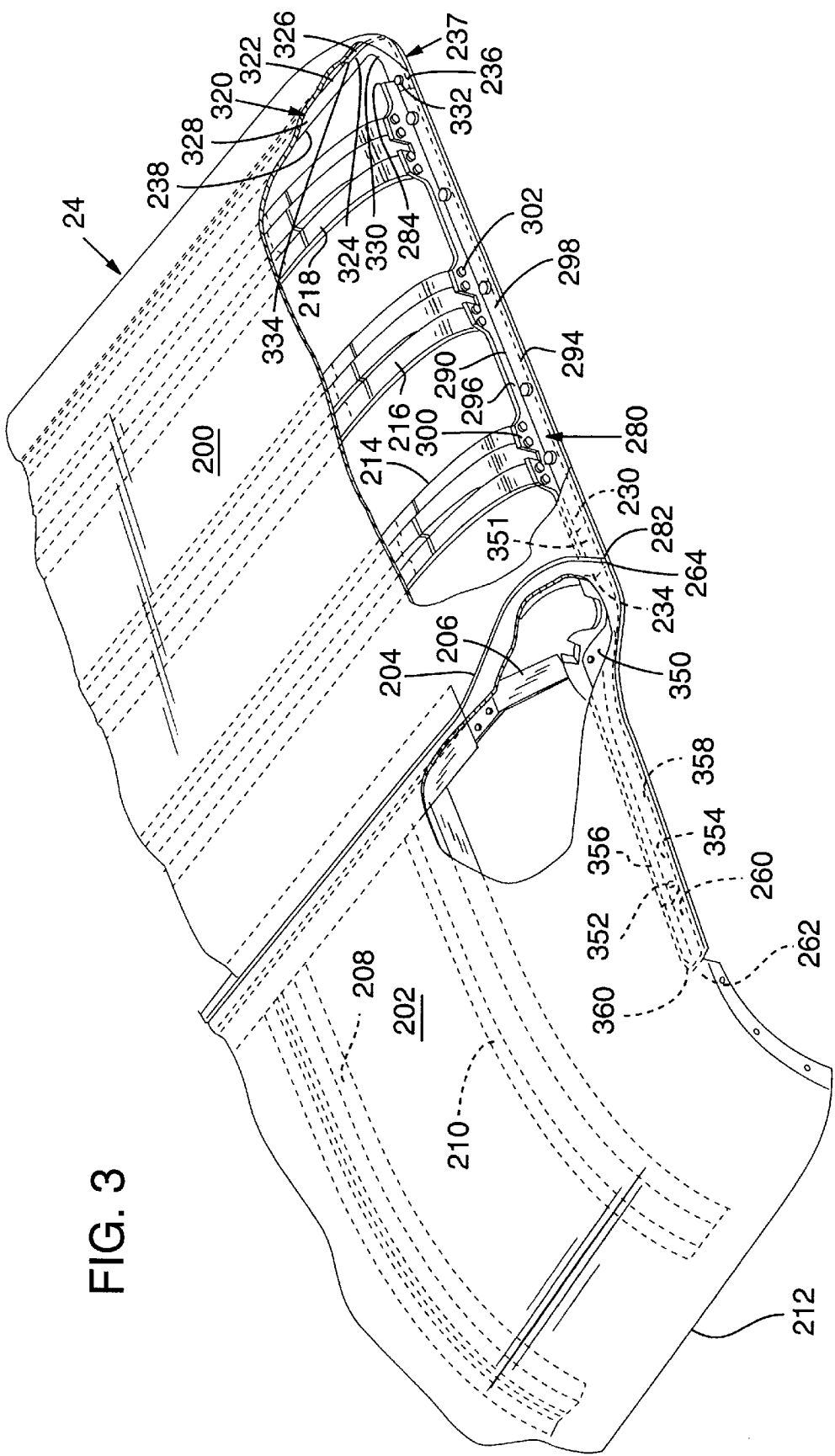
FIG. 3 is a perspective view of a roof with reinforcing elements in accordance with one form of the present invention.

The roof 24, and its associated components which form a part of the roof mounting structure of the present invention, in one embodiment thereof is best understood with reference to FIGS. 3–5. The roof 24 may be molded of fiberglass or of a composite material. Alternatively, the roof 24 may be made of metal such as steel or aluminum by stamping, casting or any other suitable manufacturing process. In addition, the roof 24 may be of a unitary construction and may assume a raised roof or other configuration different from that shown in FIGS. 3–5.

The illustrated roof 24 is stamped of aluminum and includes a rear roof section 200 and a front roof section 202. The front roof section 202 and rear section 200 are lapped over one another at 204 to form a conventional lap joint. Adhesives or other caulking is typically included at the lap joint, in addition to fasteners, to secure the roof sections together. In addition, a transverse reinforcing bracket 206 extends across the vehicle, from side to side thereof, underneath the roof at the location of the lap joint 204 to reinforce the roof at this location. Additional reinforcing ribs such as ribs 208, 210 may extend forwardly to the front 212 of roof section 202 from the reinforcing rib 206 (another pair of such ribs being included at the far side of the roof, not shown in FIG. 3). The roof section 200 also may include a plurality of reinforcing ribs, such as ribs 214, 216 and 218, extending in a direction which is transverse to the longitudinal axis of the vehicle and from side to side of the roof structure.

As best seen in FIG. 4, the rear roof section 200 includes an inwardly directed flange portion 230 which, in the illustrated form, extends substantially around the entire lower periphery of roof section 200. That is, a first flange section 232 is positioned along a first side of the roof section 200. Flange section 232 extends from a position 234 adjacent the forward edge of the roof section 200 to a position 236 adjacent the corner 237 of the roof section. A similar flange portion (not shown) is positioned along the opposite side of the roof section 200. Another inwardly projecting flange portion 238 is positioned along the rear edge portion of the roof section 200. This flange 238 commences at a location 240 near the corner 237 and extends to a location near the opposite corner of the roof. Openings such as indicated at 242 are provided along the length of the flange sections 232, 238 for receiving fasteners when the roof mounting structure is coupled to the sidewalls and backwall of the truck. As can thus be seen from FIG. 4, the inwardly projecting roof flanges associated with roof section 200 extend along a major portion of the periphery of the roof. Most specifically, these flange portions extend substantially along the entire side and back boundaries of the roof. The flanges are typically truncated or of a narrower width (see flange portion 250) at the roof corners. Although they may be discontinuous, the flange portions 230 and 238 are preferably continuous along their length.

In a similar manner, the forward roof section 202 may include an inwardly projecting flange section 260 commencing at a location 262 adjacent to the roof section 200 and terminating at a forward location 264 adjacent to the front edge 212 of the roof 24. Inwardly projecting flange portion 260 thus spans the transition region where the cab widens moving from the forward portion of the cab toward the sleeper compartment portion of the cab.

An upper elongated reinforcing elements is provided at the periphery of the roof. As best seen in FIG. 3 (see also FIG. 6), this latter reinforcing element includes a roof side section reinforcing element 280 (one being shown in FIG. 3) extending along the side of the roof section 200. Reinforcing element 280 is preferably positioned on top of the inwardly projecting flange 230. Reinforcing element 280 starts at a forward end 288 adjacent the forward end 238 of roof flange 230. The reinforcing element terminates at a rear end 284 which is adjacent to the rear end portion 236 of the flange 230. Preferably, the reinforcing element 280 extends continuously along a major portion of the length of the flange 230 and along the sidewall of the roof and most preferably extends substantially continuously along the entire length of the flange 230. Alternatively, the reinforcing element may be formed of discrete spaced apart sections, although this is less preferred.

The reinforcing element 280 preferably defines an upwardly opening channel 290. More specifically, the illustrated reinforcing element 280 includes a base 298 and respective outer and inner sidewalls 294, 296 which are spaced apart to define the channel 290 therebetween. A plurality of fastener receiving elements such as nuts 292 may be mounted to the upper surface of base 298. The nuts 292 are in alignment with fastener receiving openings provided through the reinforcing element and are aligned with the openings 242 (FIG. 4) through the flange 230 when the reinforcing element 280 is in position. By welding or otherwise mounting these nuts 292 in place, bolts may be used to assemble the structure without the assembler having to fumble around in a tight space to try and thread a bolt through a nut in a blind location.

The inner leg 296 of reinforcing element 280 includes upwardly projecting rib joining tab or ear portions, several being indicated at 300 in FIG. 3. The transverse ribs, such as rib 214, are secured to the rib joining ear 300, such as by fasteners (for example, using rivets or huck bolts). One such fastener is indicated at 302 in FIG. 3 in association with rib 216. As a result, the upper reinforcing elements and roof are rigidly interconnected. The opposite side of roof section 200 is provided preferably with a reinforcing element which is identical to the element 280 and thus will not be discussed.

An elongated rear roof reinforcing element 320 is provided along the rear wall of the roof 24 (see FIGS. 3 and 9), preferably above the inwardly projecting rear roof flange portion 238. Elongated reinforcing element 320 most preferably defines an upwardly opening channel along its length, the channel being indicated at 322 in FIGS. 3 and 9. Most specifically, the illustrated reinforcing element 320 includes a base 324 and first and second respective outer and inner legs 326, 328 which project upwardly from the base 324 to define the channel 322 therebetween. Reinforcing element 320 preferably extends continuously across a major portion of the rear reinforcing flange 238 and most preferably extends continuously from a first location adjacent the corner 237 of the roof to the opposite corner of the roof. The adjacent ends of the reinforcing elements 280, 320 at corner 237 (and likewise at the opposite corner, although not shown) are joined together by an upper corner roof reinforcing element 330. Element 330 also preferably defines an upwardly opening channel. The element 330 has first and second ends 332, 334 which in this illustrated form are inserted into the respective end portions of elements 280, 320, respectively, in a telescoping-like manner. This corner construction is best seen in FIGS. 3 and 7. Thus, the reinforcing elements 280 and 320 are rigidly interconnected at the corners of the roof section 200.

The forward roof section 202 also includes side roof reinforcing elements preferably positioned above the inwardly projecting roof flange 260. As can be seen in FIGS. 3 and 8, the illustrated form of front roof section reinforcing elements include a reinforcing bracket 350. The bracket 350 has a tail section 351 which is inserted into and fastened within the channel defined by the forward end of the reinforcing element 280 when the roof sections 200, 202 are assembled. In addition, the forward end of the bracket 350 comprises an upwardly opening channel element 352 having a base 354 and first and second side legs 356, 358 which define the channel therebetween. The elongated forward reinforcing portion of the bracket 350 terminates at a location 360 which is substantially coextensive with the end 262 of the flange 260.

Thus, the bracket 350, the upper sidewall reinforcing element 280, the upper corner reinforcing element 330, upper rearwall reinforcing element 320, and corresponding elements at the opposite side of the roof form a reinforcing element structure which extends along a major portion of the lower periphery of the roof. More specifically, when these components are interconnected, they provide a continuous reinforcing element structure along substantially the entire sidewall and rearwall periphery of a truck roof commencing at a location approximately at the forward edge of a driver's side door and ending at approximately the forward edge of the passenger side door of the truck.

As best seen in FIGS. 6, 7 and 9, in the illustrated roof structure, the outermost leg of the upper reinforcing elements at such locations is shorter than the innermost leg of the reinforcing elements. As a result, the reinforcing elements accommodate the curvature of the roof cap forming section 200.

The elongated lower sidewall and rearwall reinforcing elements and the elongated upper roof reinforcing elements, when assembled, each may thus assume a generally U-shaped configuration having side legs or side portions along the respective sides of the vehicle and rear leg or back portion along the backwall of the vehicle. In addition, these reinforcing elements, when the mounting structure is assembled as explained in greater detail below, sandwich the inwardly projecting lower peripheral flanges of the roof and the inwardly projecting flanges of the sidewalls between clamping portions of the reinforcing elements. Thus, when these elements are coupled together, they firmly hold the roof and sidewall sections in an assembled state. The upper and lower reinforcing elements each therefore comprise one form of a halo or clamping element designed to reinforce the coach joint formed by the overlapping roof and sidewall flanges and the backwall joint involving, in the illustrated form, the roof flange.

These halo elements may be continuous from a first location at the side of the vehicle and across the back of the vehicle to a second location at the opposite side of the vehicle. Alternatively, and less preferably, these halo elements may be discontinuous as well. However, preferably the halo elements are elongated and extend along a major portion of the perimeter of the roof and sidewalls and most preferably also along a major portion of the rearwall. By major portion, it is meant that it is preferred that these reinforcing elements extend along at least fifty percent of the perimeter of the sides and back of the roof. Most preferably, the reinforcing elements extend to a greater extent, for example about the entire roof perimeter commencing at about one door location and extending rearwardly from such locations around the entire periphery of the truck to a similar location at the opposite door of the truck.

With further reference to FIG. 6, the assembled roof to sidewall joint can best be seen. When assembled, flange portion 30 along sidewall 14 abuts the inwardly projecting flange portion 230 of the roof section 200. Adhesive tape and caulking material may be placed between the flanges 30, 230, for sealing purposes. A fastener, such as a threaded bolt 391, is inserted through the openings provided through the base 90 of the lower reinforcing element 80, the flange 30, the flange 230, and the base 298 of the upper reinforcing element 280. The fastener 390 is threaded into a nut 292 mounted to the upper surface of base 298. When tightened, the fastener draws the roof section and sidewall together. In its assembled state, the reinforcing element 280 nests between the roof 200 and the reinforcing engagement leg 98 of the reinforcing element 80.

As can also be seen in FIG. 6, the inner surface 390 of the leg 296 is tapered or inclined outwardly from the base 298 moving toward the distal end of the leg 296. This surface, in combination with the inclined surface 100 of the upper end of leg 98, assists in guiding the roof into position on the sidewall of the vehicle. That is, as the roof cap is lowered into place, surface 390 engages the surface 200 and directs the roof section into position with the fastener receiving openings aligned with one another. Because these fastener receiving openings are preferably pre-formed, when fasteners are tightened a flush or other more precise alignment of the roof 24 and sidewall 14 is achieved.

FIG. 7 illustrates the joint construction taken through the corner 237 of the roof assembly and illustrates how the corner reinforcing elements 126, 330 provide respective downwardly and upwardly opening channel reinforcement structures for sandwiching at least an inwardly projecting flange portion 250 of the roof therebetween. Although not included in this embodiment, a similar inwardly projecting portion of the sidewall flange may also be clamped between these reinforcing elements 126, 330. In addition, FIG. 8 illustrates the roof mounting assembly through the bracket 350 at a location approximately above one of the doors of the vehicle. The forwardmost portion 212 of roof section 202 is typically riveted or bolted to the truck undersupport structure. FIG. 9 shows the roof mounting assembly at the backwall of the truck. Again, although not shown in these figures, double faced adhesive tape and caulking is typically provided to seal the roof to sidewall and backwall joint.

With the above construction, it should be apparent that the roof 24 can be readily removed, such as for repair or replacement purposes. That is, the roof rear section 200, for example, may be loosened by simply by removing the bolts 290. The relatively few rivets or huck bolts at the forward end 212 of roof section 202 may be drilled out. The freed roof 24 may then be lifted clear of the lower cab assembly of the truck.

Having illustrated and described the principles of our invention with reference to several preferred embodiments, it should be apparent to those of ordinary skill in the art that the invention may be modified in arrangement and detail without departing from such principles. For example, the configurations of the reinforcing elements may be varied while still providing the desired reinforced joint structure for joining the roof cap to the side and rearwalls of the vehicle. In addition, although not as preferred, the reinforced joint configurations of the present invention may be provided at selected locations along the roof/sidewall and/or rearwall rather than extending about a major portion of each of these sidewalls and rearwall. We claim as our invention all such modifications as fall within the scope and spirit of the following claims:

What is claimed is:

1. A truck roof mounting system comprising:
   a sidewall with a sidewall upper edge portion;
   an inwardly projecting sidewall flange portion along at least a major section of the sidewall upper edge portion;
   a roof with a roof lower edge portion;
   an inwardly projecting roof flange portion along at least a major section of the roof lower edge portion;
   a first elongated reinforcing element which is longer than it is wide, which is positioned at least in part above the projecting roof flange portion and which extends along a major portion of the length of the projecting roof flange portion;
   a second elongated reinforcing element which is longer than it is wide, which is positioned at least in part below the projecting sidewall flange portion and which extends along a major portion of the length of the projecting sidewall flange portion; and
   the first and second reinforcing elements being coupled together to clamp the roof flange portion and sidewall flange portions into fixed relative positions thereby joining the sidewall and roof.

2. A truck roof mounting system according to claim 1 wherein the first reinforcing element defines an upwardly opening elongated channel and wherein the second reinforcing element defines a downwardly opening elongated channel.

3. A truck roof mounting system according to claim 1 wherein each of the first and second reinforcing elements have a base portion and spaced apart first and second side leg portions projecting outwardly from the base portion to define the respective elongated channels between the first and second leg portions.

4. A truck roof mounting system according to claim 3 wherein at least a major portion of one of the first and second reinforcing elements is generally of a U-shaped cross-sectional configuration with the first and second side leg portions comprising the legs of the U-shaped configuration and the base portion comprising the base of the U-shaped configuration.

5. A truck roof mounting system according to claim 1 in which the truck includes a sleeper compartment having first and second sidewalls and a backwall each with an upper edge portion, each of the first and second sidewalls having respective inwardly projecting sidewall flange portions extending along a major portion of the sidewall upper edge portion, the roof having roof side and roof back lower edge portions with the roof flange portion extending along a major portion of the roof side and roof back lower edge portions, the roof flange portion overlying and being substantially coextensive with the sidewall flange portions when the roof is assembled to the sidewalls and backwall, the first and second reinforcing elements also being coextensive with at least a major portion of the backwall and with the sidewall and roof flange portions, whereby the roof flange portion and respective sidewall flange portions are clamped together by the first and second reinforcing elements along at least a major portion of the periphery of the roof.

6. A truck roof mounting system comprising:
   a sidewall with a sidewall upper edge portion;
   an inwardly projecting sidewall flange portion along at least a section of the sidewall upper edge portion;
   a roof with a roof lower edge portion;
   an inwardly projecting roof flange portion along at least a section of the roof lower edge portion;
   a first elongated reinforcing element positioned at least in part above the projecting roof flange portion;
   a second elongated reinforcing element positioned at least in part below the projecting sidewall flange portion;
   the first and second reinforcing elements being coupled together to clamp the roof flange portion and sidewall flange portions into fixed relative positions thereby joining the sidewall and roof;
   wherein at least a major portion of one of the first and second reinforcing elements is generally of a U-shaped cross-sectional configuration with the first and second side leg portions comprising the legs of the U-shaped configuration and the base portion comprising the base of the U-shaped configuration; and
   wherein the roof flange portion and the sidewall flange portion each have an inward edge, and wherein at least a major portion of one of the first and second reinforcing elements has a generally h-shaped cross sectional configuration with a portion of the h-shaped reinforcing element extending past the inward edges of the roof flange portion and sidewall flange portion from a position below such roof and sidewall flange portions to a position above such roof and sidewall flange portions.

7. A truck roof mounting system comprising:
   a sidewall with a sidewall upper edge portion;
   an inwardly projecting sidewall flange portion along at least a section of the sidewall upper edge portion;
   a roof with a roof lower edge portion;
   an inwardly protecting roof flange portion along at least a section of the roof lower edge portion;
   a first elongated reinforcing element positioned at least in part above the protecting roof flange portion;
   a second elongated reinforcing element positioned at least in part below the projecting sidewall flange portion;

the first and second reinforcing elements being coupled together to clamp the roof flange portion and sidewall flange portions into fixed relative positions thereby joining the sidewall and roof; and the second elongated reinforcing element has a base portion underlying the sidewall flange portion, a downwardly projecting outer leg portion abutting the sidewall, and an inner leg portion having a downwardly projecting sidewall frame structure engaging flange portion and an upwardly projecting first reinforcing element engaging flange portion, the first reinforcing element engaging flange portion extending upwardly to a position above the roof flange portion, and wherein the first elongated reinforcing element includes a base flange portion overlying the roof flange portion, an upwardly projecting outer leg flange portion, and an upwardly projecting inner leg flange portion which engages the first reinforcing element engaging flange portion upon assembly of the roof mounting system, and wherein the first elongated reinforcing element nests with the space between the upwardly projecting first reinforcement element engaging flange portion and the roof.

8. A truck roof mounting system according to claim 7 wherein the upwardly projecting inner leg flange portion of the first reinforcing element has an inwardly inclined guide surface extending from the base portion toward the distal end of such leg portion and wherein the first reinforcing element has a generally U-shaped cross sectional configuration.

9. A truck roof mounting system according to claim 7 wherein the inner leg flange portion of the first reinforcing element has an inwardly inclined guide surface portion positioned to engage the first reinforcing element engaging flange portion as the roof is lowered onto the sidewall and being operable to guide the first reinforcing element into its nested position to thereby align the roof and sidewall.

10. A truck roof mounting system comprising:
a sidewall with an upper edge portion having an inwardly projecting sidewall lip along at least a major portion thereof;
a roof with a lower edge portion having an inwardly projecting roof lip along at least a major portion thereof;
first and second elongated halo elements extending along a major portion of the roof lip and sidewall lip in position to sandwich the lip portions between them and which are coupled to the lip portions to mount the roof to the sidewall.

11. A truck roof mounting system according to claim 10 wherein the first halo element defines an upwardly opening elongated channel above the roof lip, and wherein the second halo element defines a downwardly opening elongated channel below the sidewall lip.

12. A truck roof mounting system according to claim 11 in which the first and second halo elements are each comprised of a plurality of interconnected halo element forming sections.

13. A roof mounting system according to claim 12 in which one of the first and second halo elements includes a plurality of halo forming sections which are generally of an h-shaped cross-section.

14. A roof mounting system according to claim 10 in which the first and second halo elements and the lip elements are positioned at least along one-half of the periphery of the roof lower edge portion and sidewall upper edge portion so as to clamp at least one-half of the periphery of the roof lower edge portion and sidewall upper edge portion between the first and second halo elements.

15. A roof mounting system according to claim 10 for a truck having first and second sidewalls and a backwall and wherein the first and second halo elements and the lips extend along at least one-half of the first and second sidewalls and the first and second halo elements also extend along at least one-half of the backwall of the truck so as to clamp at least one half of the periphery of the roof lower edge portion and sidewall upper edge portion between the first and second halo elements.

16. A roof mounting system according to claim 10 in which the first and second halo elements extend continuously from a location along the first sidewall, along the backwall and to a location along the second sidewall.

17. A roof mounting system according to claim 10 including sidewall to sidewall spanning roof reinforcing ribs coupled to the first halo element at the first sidewall and to the first halo element at the second sidewall.

18. A truck roof mounting system according to claim 10 in which a first halo element has a reinforcing leg positioned to extend past the roof lip and past the sidewall lip and into a position adjacent to the second halo element.

19. A truck roof mounting system comprising:
first and second elongated reinforcing channel elements;
a roof having a lower edge with an inwardly projecting roof flange portion along at least a section of the lower edge;
a sidewall having an upper edge with an inwardly projecting sidewall flange portion along at least a section of the upper edge;
the first and second reinforcing channel elements defining respective lengthwise elongated upwardly opening and downwardly opening channels, the first reinforcing channel element having an elongated base portion positioned to clamp an elongated section of the roof lower edge, the second reinforcing channel element also having an elongated base portion positioned to clamp an elongated section of the sidewall upper edge, the first and second reinforcing channel elements sandwiching the roof flange and sidewall flange portions therebetween; and
a plurality of fasteners spaced along the length of the channel elements and penetrating each of the channel elements and the sandwiched roof and sidewall flange portions.

20. A truck roof mounting system according to claim 19 in which the truck has first and second sidewalls and a backwall, the sidewalls each including inwardly projecting sidewall flange portions along at least a major portion of their entire upper edge portions, the roof having a flange portion extending along at least a major portion of the sidewall flange portions, and wherein the first and second reinforcing channel elements also extend along at least a major portion of the sidewall and roof inwardly projecting flange portions and also at least along a major portion of the backwall.

21. A truck roof mounting system according to claim 20 in which the truck has a sleeper compartment with first and second sidewalls and a backwall, the first and second reinforcing channel elements extending continuously from a location along the first sidewall, to the backwall, across the backwall and to a location along the second sidewall.

22. A truck roof mounting system according to claim 19 in which the fasteners comprise threaded bolts and in which one of the first and second reinforcing channel elements has bolt receiving nuts mounted thereto for receiving the threaded bolts.

23. A truck panel mounting structure for interconnecting panels of a vehicle comprising:
- a first roof panel having a major surface and a lower edge portion;
- the roof panel having a roof flange portion projecting in a first direction inwardly from the lower edge portion;
- a second wall panel having a major surface and an upper edge portion;
- lengthwise elongated first and second reinforcing elements which are longer than they are wide and which are positioned to extend lengthwise along the roof lower edge portion and along the wall panel upper edge portion with the reinforcing elements sandwiching the roof flange portion between them; and
- a plurality of fasteners extending through the first and second reinforcing elements and through the roof flange portion to secure first and second panels together along their edge portions.

24. A truck panel mounting structure according to claim 23 in which the first and second reinforcing elements define respective channels which open in a direction opposite to one another and away from the roof flange portion.

25. A truck panel mounting structure for interconnecting panels of a vehicle comprising:
- a first roof panel having a major surface and a lower edge portion;
- the roof panel having a roof flange portion projecting in a first direction inwardly from the lower edge portion;
- a second wall panel having a major surface and an upper edge portion;
- elongated first and second reinforcing elements positioned to extend lengthwise along the roof lower edge portion and along the wall panel upper edge portion with the reinforcing elements sandwiching the roof flange portion between them;
- a plurality of fasteners extending through the first and second reinforcing elements and through the roof flange portion to secure first and second panels together along their edge portions;
- the first and second reinforcing elements defining respective channels which open in a direction opposite to one another and away from the roof flange portion; and
- the first reinforcing element is generally U-shaped in cross section and the second reinforcing element is generally h-shaped in cross section, the second reinforcing element having a leg which is positioned to engage the first reinforcing element with the first reinforcing element being nested between the leg and one of the first and second panels.

26. A truck mounting structure for interconnecting panels of a vehicle comprising:
- a first roof panel having a major surface and elongated first flange projecting in a first direction from an edge portion of the roof panel;
- a second wall panel having a manor surface and an elongated second flange protecting in the first direction from an edge portion of the wall panel;
- the roof and wall panels being positioned with the first and second flange portions being positioned adjacent to and overlapping one another;
- elongated first and second reinforcing elements positioned to extend lengthwise along the first and second flange portions with the reinforcing elements sandwiching the first and second flange portions between them;
- a plurality of fasteners extending through the first and second reinforcing elements and through the first and second flanges to secure first and second panels together along their edge portions; and
- wherein the first and second flange portions have first surfaces adjacent to one another and second opposed surfaces, and wherein the second reinforcing element has a base positioned adjacent to and extending along the second surface of the second flange portion, the first reinforcing element has a base positioned adjacent to and extending along the second surface of the first flange portion, and wherein the second reinforcing element has a reinforcing element leg portion which extends from the base of the second reinforcing element and across the first and second flange portions and into engagement with the first reinforcing element.

27. A truck panel mounting structure according to claim 26 in which the first reinforcing element is generally U-shaped in cross section and the second reinforcing element is generally h-shaped in cross section, the second reinforcing element having a leg which is positioned to engage the first reinforcing element with the first reinforcing element being nested between the leg and one of the first and second panels.

28. A truck panel mounting structure for interconnecting panels of a vehicle comprising:
- a first roof panel having a major surface and elongated first flange projecting in a first direction from an edge portion of the roof panel;
- a second wall panel having a major surface and an elongated second flange projecting in the first direction from an edge portion of the wall panel;
- the roof and wall panels being positioned with the first and second flange portions being positioned adjacent to and overlapping one another;
- lengthwise elongated first and second reinforcing elements which are longer than they are wide and which are positioned to extend lengthwise along the first and second flange portions with the reinforcing elements sandwiching the first and second flange portions between them; and
- a plurality of fasteners extending through the first and second reinforcing elements and through the first and second flanges to secure first and second panels together along their edge portions.

29. A truck roof mounting system comprising:
- a sidewall with an upper edge portion having an inwardly projecting sidewall lip along at least a portion thereof;
- a roof with a lower edge portion having an inwardly projecting roof lip along at least a portion thereof;
- first and second elongated halo elements which sandwich the lip portions between them and which are coupled to the lip portions to mount the roof to the sidewall; and
- a plurality of fasteners extending through the first halo element, the roof lip, the sidewall lip and the second halo element.

* * * * *

UNITED STATES PATENT AND TRADEMARK OFFICE
CERTIFICATE OF CORRECTION

PATENT NO. : 5,769,486
DATED : June 23, 1998
INVENTOR(S) : Novoa et al.

It is certified that error appears in the above-identified patent and that said Letters Patent is hereby corrected as shown below:

Column 7,
Line 34, change "lip a flange" to -- lip or flange --.

Column 10,
Line 13, change "sections which" to -- sections, which --.

Column 12,
Line 62, change "protecting": to -- projecting --.
Line 65, change "protecting" to -- projecting --.

Column 15,
Line 58, change "manor" to -- major --.
Line 59, change "protecting" to -- projecting --.

Signed and Sealed this

Seventh Day of May, 2002

Attest:

JAMES E. ROGAN
*Attesting Officer*       *Director of the United States Patent and Trademark Office*